United States Patent
Skinner

(10) Patent No.: US 6,703,930 B2
(45) Date of Patent: Mar. 9, 2004

(54) PERSONAL ALERTING APPARATUS AND METHODS

(75) Inventor: Davey N. Skinner, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 158 days.

(21) Appl. No.: 09/971,863

(22) Filed: Oct. 5, 2001

(65) Prior Publication Data

US 2003/0067386 A1 Apr. 10, 2003

(51) Int. Cl.[7] .............................. H04Q 7/00; G08B 1/00
(52) U.S. Cl. .............................. 340/539.11; 340/539.17; 340/539.18; 340/531; 379/38
(58) Field of Search ................................ 340/539, 531, 340/500, 501, 502, 3.1, 3.54, 7.29, 539.1, 539.11, 539.17, 539.18; 700/17, 83; 379/37–41

(56) References Cited

U.S. PATENT DOCUMENTS

| | | | | |
|---|---|---|---|---|
| 5,917,405 A | * | 6/1999 | Joao | 340/426 |
| 6,014,572 A | * | 1/2000 | Takahashi | 455/567 |
| 6,147,601 A | * | 11/2000 | Dandelman et al. | 340/506 |
| 6,160,477 A | | 12/2000 | Sandelman et al. | 340/506 |

* cited by examiner

*Primary Examiner*—Donnie L. Crosland

(57) ABSTRACT

Methods and apparatus for detecting the occurrence of an event and notifying a user of the event as well as the nature of the event. The user can be in practically any local or remote location relative to the location of the event. The user can establish criteria in accordance with which an alerting message is routed to any of various destinations which can be various types of communication devices monitored by the user. The user can also establish criteria in accordance with which the mode of the alerting message is presented to the user.

4 Claims, 3 Drawing Sheets

PERSONAL ALERTING APPARATUS AND METHODS

FIELD OF THE INVENTION

This invention pertains to apparatus and methods for alerting a user to the occurrence of an event. More specifically, the invention pertains to apparatus and methods for detecting, routing, and presenting alerting messages which are generated in response to the occurrence of an event.

BACKGROUND OF THE INVENTION

Many types of prior art alerting systems are known. The term "alerting system" as used herein is meant to include any type of monitoring system that is configured to both detect the occurrence of at least one predefined event, and transmit a signal in response to the occurrence of the event in order to alert an intended individual, or entity. For example, a smoke alarm is one well-known type of alerting system that is generally configured to monitor a given area of a building or the like for the presence of smoke. If smoke is detected by the system, an audible signal is generally transmitted to notify the occupant(s) of the building of the presence of smoke, which can indicate a fire or the like. The occupant(s), once notified of the occurrence of the event (detection of smoke), can take appropriate action in response to the event.

Many other types of alerting systems are known, including fire alarms, burglar alarms, and equipment monitoring systems, among others. Some prior art alerting systems are configured to transmit alerting signals, by wire an/or by wireless means, to one or more remote locations. One such alerting system is disclosed in U.S. Pat. No. 6,160,477 to Sandelman, et al, which is incorporated herein by reference.

The system disclosed by the Sandelman patent is configured to monitor remote equipment, such as heating, ventilation, and air conditioning (HVAC) equipment. A sensor is in communication with a piece of remote equipment, and a local transmitter is connected to the sensor. An interface unit, having a message generating mechanism and an antenna, is capable of receiving signals from the sensors of several pieces of equipment, forming a local network. A central computer server is in communication with the interface unit and is adapted to receive and preferably store messages generated by the interface unit.

When a sensor detects an exception condition in a piece of remote equipment, the sensor transmits a signal to the interface unit, and the interface unit generates an incoming exception message and forwards the message to the server. The server forwards at least one outgoing exception message to at least one predetermined user-defined communication device based on the incoming exception message. Multiple outgoing exception messages may be forwarded to multiple communication devices in accordance with a user-defined message profile, or a single outgoing exception message may be forwarded in response to receipt of multiple incoming exception messages. The message profile is remotely configurable by the user. Incoming and/or outgoing exception messages are stored and later retrievable and sortable by any of a number of parameters such as brand, model, installation date, local climate, and local weather conditions.

What are needed then, are alerting methods and apparatus which achieve the benefits to be derived from similar prior art devices, but which avoid the shortcomings and detriments individually associated therewith.

SUMMARY OF THE INVENTION

The invention includes methods and apparatus for detecting the occurrence of a user-specified event and sending an alerting message to a user in response to the occurrence of the event. In accordance with the instant invention, the location of the event and the location of the user when receiving the alerting message can be practically any two respective locations in the world. The invention can be employed to detect a wide array of conditions such as fire or smoke, loss of electrical power, failure of an appliance (such as a refrigerator), or a medical emergency (as detected by medical monitoring devices) among others. In accordance with the invention, the alerting message can be routed to any of a variety of available communication devices so as to be presented to the user whether the user is nearby or at a remote location. For example, if the invention is employed to detect the occurrence of events within a home, the homeowner can be alerted to the occurrence of an event whether in the home, in the yard, at the office, shopping, or anywhere in the world by way a communication device. The communication device can be, for example, any internet-enabled device such as a watch-device, television, a telephone, a cellular phone, a pager, a computer (both desktop and laptop), or a handheld PDA (personal digital assistant). The alerting message can be presented to the user in any of a number of possible modes which allows more versatility in the use of the instant apparatus and methods, including adaptation thereof for use by sensory-impaired persons. For example, the alerting message can be presented to the user in an audible mode, a visual mode, mechanical mode, or electrical sensory mode, thus removing limitations to sensory impaired individuals.

In accordance with one embodiment of the present invention, a personal alerting apparatus includes a sensor which is configured to monitor and detect a specified event. Once an event of the specified type is detected by the sensor, a signal is transmitted by the sensor, wherein the signal contains information which can be indicative of the event. The apparatus also includes a user-selectable communication device which is carried by, or otherwise accessibly by, the user. The communication device is configured to receive the signal in the form of an alerting message which indicates that the event has occurred and also indicates the nature of the event.

In accordance with another embodiment of the present invention, a personal alerting apparatus includes a first sensor that is configured to detect a first event and that is also configured to transmit a first signal when the first event occurs. Similarly, a second sensor is configured to detect a second event, wherein the second sensor also transmits a second signal when the second event occurs. A communication device is also included, as is a first controller and a second controller. The first controller is configured to receive the first signal from the first sensor and to route the first signal to the second controller along with a first message which is descriptive of the first event. The second controller is configured to receive the first signal along with the first message. The second controller can then route the first signal and first message to the communication device. The second controller also is configured to receive the second signal from the second sensor and to route the second signal, along with a second message, to the communication device.

In accordance with another embodiment of the present invention, a personal alerting method includes detecting the occurrence of an event. When the event is detected, a unique signal is transmitted in response to the event. An alerting message is generated in response to the signal, wherein the message is indicative of the nature of the event. The message is routed in accordance with pre-established criteria. Likewise, the mode of the message is also determined in accordance with pre-established criteria.

DETAILED DESCRIPTION OF THE INVENTION

The present invention includes methods and apparatus for detecting an event, and for alerting a user of the occurrence of the event by way of a message, wherein the user can be at nearly any local or remote location, and wherein the user can establish criteria for the routing of the message as well as the mode in which the message is presented.

Figure 1:
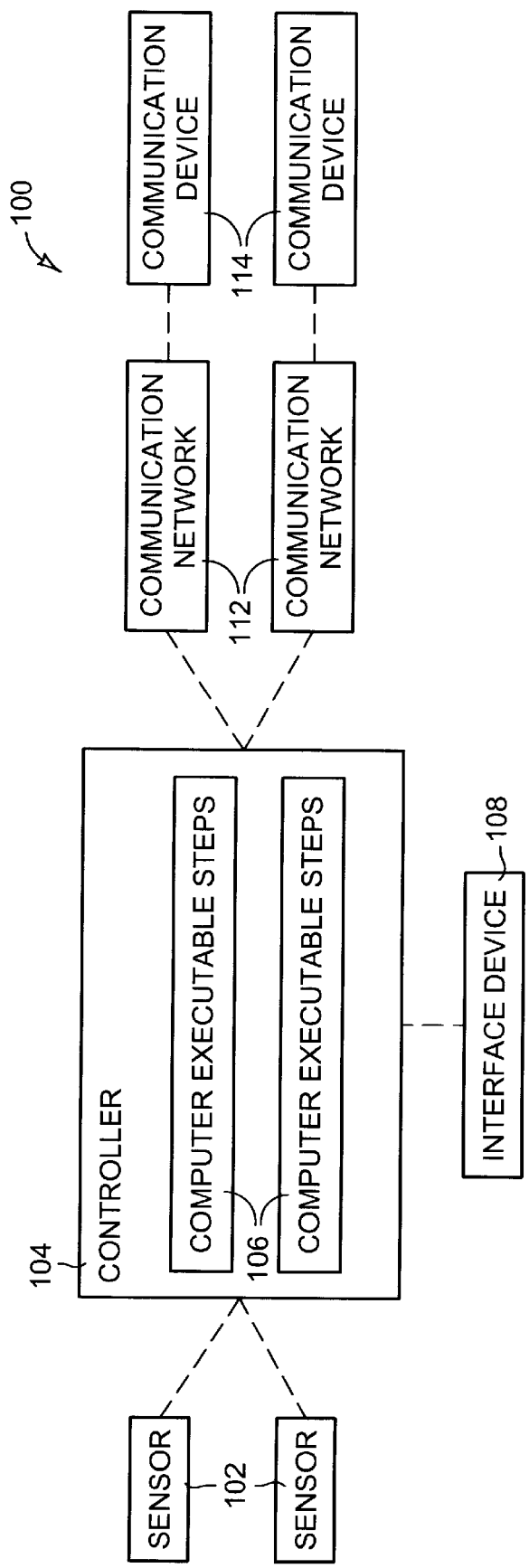
FIG. 1 is a schematic diagram of an apparatus in accordance with one embodiment of the present invention.

Turning to FIG. 1, a schematic diagram is shown which depicts an apparatus 100 in accordance with one embodiment of the present invention. The apparatus 100 is generally configured as an alerting system. That is, the apparatus 100 is generally configured to both detect the occurrence of at least one predefined event, and transmit a signal in response to the occurrence of the event in order to alert an intended individual, or entity of the event.

The apparatus 100 comprises at least one sensor 102. The sensor 102 will be more fully described below. The apparatus 100 also comprises a controller 104 which can be a personal computer or the like. However, it is understood that the controller 104 can be any of a number of devices that are configured to operate as a controller. For example, the controller 104 can be a micro-processor or the like. The sensors 102 and the controller 104 are configured to connect with one another in signal communication there between. The controller 104 preferably contains a series of computer-executable steps 106 which can be executed to perform any of a number of procedures and/or processes. The controller 104 as well as the computer-executable steps 106 will be explained below in greater detail.

Although the sensor 102 and controller 104 are shown in the accompanying figures as separate items, it is understood that the sensor and controller can be combined into a single unit. For example, a sensor device (not shown) can incorporate therein a micro-processor that is configured to operate as a controller. Thus, each sensor 102 can be alternatively configured to have its own integral, dedicated controller 104. Furthermore, it is understood that, in cases wherein the sensor incorporates a controller as described above, the sensor/controller unit can be "internet-enabled." When I refer to a given device as "internet-enabled" I mean that the given device is configured to connect in signal communication directly with the internet so as to send and/or receive data thereby. Thus, in an alternative embodiment of the instant invention, an apparatus in accordance therewith can comprise a plurality of appliances, for example, wherein each appliance includes a sensor/controller device that is internet-enabled. Such a configuration would have operational and functional aspects which are similar to those of the general embodiments of the instant invention which are described below.

The apparatus 100 also comprises at least one communication network 112. Furthermore, the apparatus 100 comprises at least one communication device which is configured to be connected in signal communication with the controller 104 by way of the communication network. The communication network 112 as well as the communication device 114 will each be described more fully below. As is also evident from a study of FIG. 1, at least one interface device 108 is preferably included in the apparatus 100. The interface device 108 is configured to enable a user of the apparatus 100 to input data, and/or read data from, the controller 104. The interface device 108 can be, for example, a keyboard or a display screen or the like.

Each sensor 102 is configured to detect the occurrence of at least one event. When I say "event" I mean an occurrence having predefined characteristics of which the respective sensor has been configured to detect. An occurrence can have any of a number of characteristics which can be detected including the presence or non-presence of smoke, natural gas, carbon monoxide, radon, water, heat, electrical current, electromagnetic radiation, light, sound, motion, the receipt of a signal (as for example, a telephone ring signal, a GPS position signal, or an emergency assistance signal), among others.

Furthermore, an event can be classified as to its type. One type of event is an "emergency event." By "emergency event" I mean an event of the type that can immediately result in the loss of life, injury, or major destruction or loss of property. Examples of emergency events include: the detection of fire, poison or flammable gas, smoke, burglary, a life-threatening medical condition, and the like. Another type of event is an "operational event." By "operational event" I mean an event which can require attention in order to prevent or alleviate inconvenient circumstances, but which is not an emergency event. Examples of operational events include: the detection of loss of electrical power, clogged furnace filter, extreme ambient temperatures, water accumulation, low hot water level, and the like. Yet another type of event is a "notification event." By "notification event," I mean an event of which notification is provided thereof primarily as a convenience and which is not an emergency event nor an operational event. Examples of notification events include: the arrival of mail, ringing of a telephone, oven timer or doorbell, completion of a washing machine cycle, drying of clothes in a clothes dryer, receipt of an e-mail message, and the like.

Therefore, for example, at least one of the sensors 102 can be configured to detect the occurrence of at least one of the following events: loss of electrical power, the presence of smoke, a flooding condition, the presence of fire, a burglary or break-in, the sound of a doorbell, the ringing of a telephone, the presence of natural gas or carbon monoxide, the operational failure of a device (such as a refrigerator, an automatic sprinkler system, or a sump pump), the occurrence of a medical emergency, a low battery voltage, the presence or absence of paper in a facsimile machine, the receipt or detection of a given signal, and the like.

The sensor can also be configured to poll for the presence of an RFID (Radio Frequency Identification) tag to determine the presence, absence, or proximity of an object bearing the tag. Thus, for example, when a family pet is provided with an RFID tag, the sensor can determine when the pet has strayed outside of a detectable range for the tag, indicating that the pet has strayed from the pet owner's property. It should be understood that the above list is exemplary only, and that the list of events which can be detected is limited only by the ability to provide a sensor or a receiver capable of detecting the event. Thus, by "event", I also mean any change in a condition which can be detected.

Each of the sensors 102 can be configured to detect the same predefined event. For example, each of the sensors 102 can be configured to detect fire, wherein each of the sensors is in a different location. Alternatively, each of the sensors 102 can be configured to detect a different event. For example, one of the sensors 102 can be configured to detect fire while another of the sensors can be configured to detect flooding. Thus, each of the sensors 102 can be in the same location or different locations, and can be configured to detect the same event or different events.

As mentioned above, each of the sensors 102 is configured to connect with the controller 104 in signal communication there between. The signal which is transmitted by the sensor 102 and received by the controller 104 can be transmitted and received by any of a number of known signal transmitting/receiving means. When I say "signal transmitting/receiving means" I mean to include any means of transmitting and receiving signals for the purpose of passing data between two or more devices. For example, signal transmitting/receiving means can include: electrical signal via hard wire; fiber optics; infrared wireless; wireless radio waves; and others. For example, the sensor 102 can connect to the controller using the recently developed Bluetooth short range wireless communication protocol. (Bluetooth is a trademark of Telefonaktiebolaget LM Ericsson CORPORATION SWEDEN.) Further, the sensor 102 can be provided with a cellular telephone, in which case the sensor signal can transmit the signal to the controller 104 via a cellular telephone network. Thus, the sensors 102 are configured to transmit a differentiable signal in response to detection of the event, wherein the signal can be received and deciphered by the controller 104 wherein the given sensor 102 which sent the signal can be identified.

For example, in the case wherein a given sensor 102 is configured to detect fire and wherein the location of the given sensor is known, the given sensor is preferably configured to send a unique signal to the controller 104 when fire is detected thereby, or to send the signal to a unique port on the controller specifically dedicated and identified for the given sensor. The controller 104, in receiving the differentiable signal from the given sensor 102 can determine that a fire has been detected. Further, in the foregoing example, since the sensor 102 can typically be associated with an identified location, the controller can additionally determine the location of the fire (i.e., between multiple dwellings, or to a specific floor within a building, or even to a specific room in a building).

The identification of the location of the event (via the location of the sensor), as well as the identification of the type of event detected, can be accomplished by any of a number of known methods. For example, as mentioned above, each sensor 102 can be configured to send a unique serial number, or code, to the controller 104 when the respective event is detected by the sensor. When the controller 104 receives the signal from a given sensor 102, the controller can compare the serial number, or code, to a list of serial numbers or codes which are stored in a controller memory (not shown) for example. Each serial number or code which is stored in the controller 104 preferably corresponds to a given location and/or a given event. Thus, when a given sensor 102 sends its respective serial number or code to the controller 104, the controller can not only determine that an event has occurred, but can determine the nature of the event as well as its location.

As mentioned above, the controller 104 is configured to connect in signal communication with the communication devices 114 by way of the respective communication networks 112. Each of the communication networks 112 can be any of a number of communication networks, including: a pager network; a telephone network; a cellular telephone network; a local area network (LAN); a wide area network (WAN); an ethernet system, a satellite system, a cable system (including analog, digital, and ISDN), Digital Subscriber Lines ("DSL"), the Internet; and the like, or any combination thereof.

Likewise, each of the communication devices 114 can be any of a number of devices which are configured to receive and transmit signals by way of the respective communication network 112. For example, if one of the communication networks 112 is a pager network, then the corresponding communication device 114 is preferably a pager. Similarly, if one of the communication networks 112 is a cellular telephone network, then the corresponding communication device 114 is preferably a cellular telephone. As yet another example, if one of the communication networks 112 is the Internet, then the corresponding communication device 114 is preferably any "internet-enabled" device such as an internet-enabled watch device, an internet-enabled television, a cellular telephone, a mobile computer, or the like. The communication devices can also include personal computers, including desktop and laptop computers, personal digital assistants (such as so-called Palmtop devices), as well as second-generation and third-generation cellular telephones.

Each of the communication devices 114 is preferably configured to display a message which is readable, or otherwise detectable and decipherable, by a user of the communication device. That is, one of the functions of each of the communication devices 114 is to receive a message in signal form from the controller 104 by way of the respective communication network 112, and to present the message so as to be communicable to the user. Furthermore, each of the communication devices 114 can be configured to present a message in any of a number of modes. For example, a communication device 114 can be configured to present a message in one or more of the following modes: audible (such as a series of beeps or audible speech); visual (such as a text message or a flashing light); mechanical (such as vibrations); and electrical (ESD) sensory-based. One or more of these modes can allow the communication devices 114 to be used by a physically impaired user.

Preferably, at least one of the communication devices 114 is in the form of a watch device or the like which is configured to be worn about the wrist of the user. The term "watch device" as used herein is meant to describe any type of communication device which is configured to be worn about the wrist of the user, and which does not necessarily include a time-keeping function. By employing such a watch device as a communication device, the user can remain in substantially constant contact with the respective communication device 114 so as to be available for the receipt of nearly any and all messages communicated from the watch to the user, even though the user (and hence the watch device) may be remote from the event which caused the message to be generated. Such a watch device is preferably configured to receive messages by wireless communication means (such as by wireless internet and/or pager means) and to present a message to the user in at least one of the modes which are described above. The watch device is more preferably internet-enabled, wherein the watch device is configured to interact directly with the internet so as to send and/or receive data thereby. Such a configuration of the communication device 114 can be especially beneficial in the case wherein the apparatus is used by a physically impaired person.

In an alternative embodiment of the present invention which is not shown, at least one of the communication devices 114 can be configured as a receiver that is configured to trigger an automatic response to a given event. For example, at least one of the communication devices 114 can be a receiver that is configured to initiate or control the operation of either an actuator that is connected to a valve or the like, or an electrical switch or the like. In this manner, for example, a message can be sent by the controller 104 to a communication device 114 that is a receiver such as described immediately above. The receiver communication device 114 can thus receive the message from the controller 104 and in response thereto initiate the operation of the respective valve or switch. Specific applications include automatically turning off a water supply valve in response to a flood message, or turning off an electrical power switch in response to a fire message.

As described above, the controller 104 preferably contains a sequence of computer-executable steps 106. The computer-executable steps 106 are preferably configured and/or configurable to provide routing instructions and other processing for any incoming signals which are sent to the controller 104 by the sensors 102. That is, the computer-executable steps 106 can be configured (for example, via the user interface 108) to cause a given signal to be identified as to the location and nature of the respective event in response to which the signal was sent by the respective sensor 102. When I say "nature" in regard to an event, I mean a characteristic of event. That is, the nature of a given event can refer to whether the event is a fire, a flood, etc. In addition, the nature of an event can refer to the location of the event, among other characteristics.

Once the nature of a given event is ascertained by the computer executable steps 106, then an appropriate message can also be generated by the computer executable steps. When I say "message" I mean any signal that, once presented to the user, is decipherable by the user so as to enable the user to understand that an event has occurred, and to understand at least the basic nature of the event. For example, a message can be generated which, when presented to the user, enables the user to understand that a fire has been detected. The message is presented to the user by the communication device 114.

Thus, the message can be presented to the user in at least one of several modes, including audible, visual, mechanical, or electrical sensory-based. An example of an audible mode is either a recorded or synthesized human voice. Another example of an audible mode is a unique sound such as a series of long and short beeps, or a tune. An example of a visual mode is a light that flashes in a given sequence (such as a series of short flashes and a series of long flashes) text. Another example of a visual mode is a string of text that is displayed on a screen or the like. An example of a mechanical mode is a unique vibration which can be, for example, a series vibrations of differing frequencies. An example of an electrical sensory-based mode is a series of electrical impulses that are applied to the user's body. For example, in the case wherein the communication device 114 is in the form of a watch device to be worn about the user's wrist, the watch device can be provided with a pair of electrodes (not shown) which contact the user's wrist. Low-power electrical impulses (electro-static discharges) can be applied to the user's wrist by way of the pair of electrodes so as to convey a message to the user through a unique series of impulses. Accordingly, the computer executable steps 106 are preferably configurable by a user (As for example, via the user interface 108) to allow a user to select the type and content of a message to be delivered in response to the occurrence (or non-occurrence) of a specific event which is detectable by the sensors 102.

As mentioned above, the computer-executable steps 106 can be configured to provide selective routing of an appropriate message to a predetermined communication device 114. When I say "selective routing" or "selectively route," I mean that the user can enter instructions into the controller 104, or otherwise configure the computer executable steps 106, so that signal and/or the respective alerting message are relayed, or routed, to predetermined communication devices 114 in accordance with predetermined criteria such as the nature of the event of which the message is indicative. For example, the user can configure the computer executable steps 106 by way of the interface 108 to send any message indicative of a fire to a given communication device 114 (such as a cellular telephone) by way of a given communication network (such as a cellular telephone network). Furthermore, the term "selectively route" or "selective routing" includes the selection of the mode in which the message is delivered to the user. The "mode" of the message is discussed further below.

In this manner, different types of alerting messages can be routed, or relayed, to different types of communication devices 114 by way of different types of communication networks 112. For example, high priority messages can be routed, or relayed, to those communication devices 114 (such as cellular telephones or pagers) which can provide more immediate notification to the user. Conversely, low priority messages can be routed, or relayed, to those communication devices 114 (such as a mobile computer via e-mail or the like, a facsimile machine, a voice messaging system, or the like) which can store such messages for later access by the user. It is understood that the priority of messages is being used herein for illustrative purposes and that any criteria can be used for routing or relaying messages to respective communication devices. That is, alerting messages can be routed in accordance with criteria other than the priority of the messages. For example, alerting messages can be routed in accordance with the time of day, the day of the week, or in accordance with any of an almost infinite number of factors.

In addition to dictating the routing of the alerting messages, the user can program, or configure, the computer executable steps 106 to compile alerting messages in a given mode, or modes, according to the type of message, or nature of the respective event. Specifically, high priority messages can be delivered in a mode, or combination of modes, that are most likely to be detected by the user. For example, a high priority message can be delivered in both visual and audible modes as well as a mechanical mode. Not only is this manner of delivering the message in multiple modes more likely to be detected and therefore received by the user, but in addition, the use of multiple modes of delivery can serve to immediately notify the user of the high priority nature of the message.

On the other hand, lower priority messages can be delivered to the respective communication device 114 in a mode which is not likely to unnecessarily disturb either the user or bystanders in close proximity to the user. Specifically, it is possible that the number of low priority messages received by the user will be substantially greater than the number of high priority messages received by the user. Thus, for example, the lower priority messages can be delivered to the appropriate communication device 114 in a text mode or the like. The text strings can then be read by the user at opportune moments. It is understood that, as in the case of routing the alerting messages, the mode of any given message can be determined in accordance with any factor or parameter.

Furthermore, it is understood that the mode of the alerting message can be configured or selected in accordance with a physical impairment of the user. That is, in the case of a visually impaired user, modes other than visual mode can be employed for presenting the alerting message to the user. For example, a visually impaired user can select to configure the apparatus 100 to present alerting messages in only audible, mechanical, and electrical sensory-based modes.

The computer executable steps 106 can be configured by the user to route, or relay, alerting messages to either greater or fewer numbers of communication devices 114 depending upon the nature of the message and the corresponding event. In other words, messages of a first priority can be routed to several different communication devices while messages of a second priority can be routed to only a single communication device. For example, a high priority message can be routed to a pager by way of a pager network, and also to a cellular telephone by way of a cellular telephone network as well as to a watch device by way of an applicable network. Conversely, a low priority message can be routed, in the form of an e-mail message for example, to a personal computer by way of the Internet. In this manner, the probability of alerting the user to a high priority message is increased by routing the message to multiple types of communication devices 114.

By way of example, the controller 104 an be configured to transmit a smoke detection alert not only the owner or caretaker of property where the smoke detector sensor is located, but also to a local fire department. Likewise, in the case wherein the sensor 102 is associated with a medical condition monitor (such as a heart monitor) and the sensor detects a serious medical condition, then the controller 104 an be configured to transmit an emergency medical alert to a relative or caretaker of the person being monitored, as well as to a local ambulance service or emergency medical service team.

When the communication device 114 is configured to not only receive messages via the communications network 112, but also is capable of transmitting information to the controller 104 via the communications network 112, then the user of a communication device 114 can remotely configure the executable steps 106 of the controller. For example, if the communication device 114 is a laptop computer provided with a cellular modem, then a user of the computer could access the controller 104 via the communication network 112 and reconfigure the computer executable instructions so as to turn on, turn off, or modify event notifications.

While the apparatus 100 has thus far been described for use in detecting a change of state resulting in an "event" which can be detected by senors 102, it should be understood that the system 100 can also be used to monitor the status of conditions in a system or environment even when an event does not occur. For example, the sensors 102 can be configured to monitor the environmental conditions in a greenhouse, and the controller 104 can be configured to provide periodic reporting to a person (or to a database) via the communication device 114 of the state of the monitored environment. Further, when the communication device allows a person to pass instructions to the controller 104 via the communication device, then a user of the communication device can periodically poll the controller to determine the state of the environment as detected by the sensors 102.

It is further understood that a user of the apparatus 100 can set up the controller 104 in a manner for which the controller transmits an alert signal as well as an information message in response to a single given event. Specifically, the primary purpose of such an alert signal is to notify the user of the occurrence of an event. The alert signal can also notify the user of the mode of the corresponding information message. The primary purpose of the information message is to inform the user of the details of the given event. Thus, for example, the user can set up the apparatus 100 so that emergency alert signals are sent to the user's pager, cellular telephone, and watch device. Furthermore, the user can dictate that the corresponding information messages are sent to the user's e-mail account. Thus, when an emergency event is detected, an alert signal is sent to the user's pager, cellular telephone, and watch device. The user can then log onto his/her e-mail account in order to receive the corresponding information message.

Figure 2:
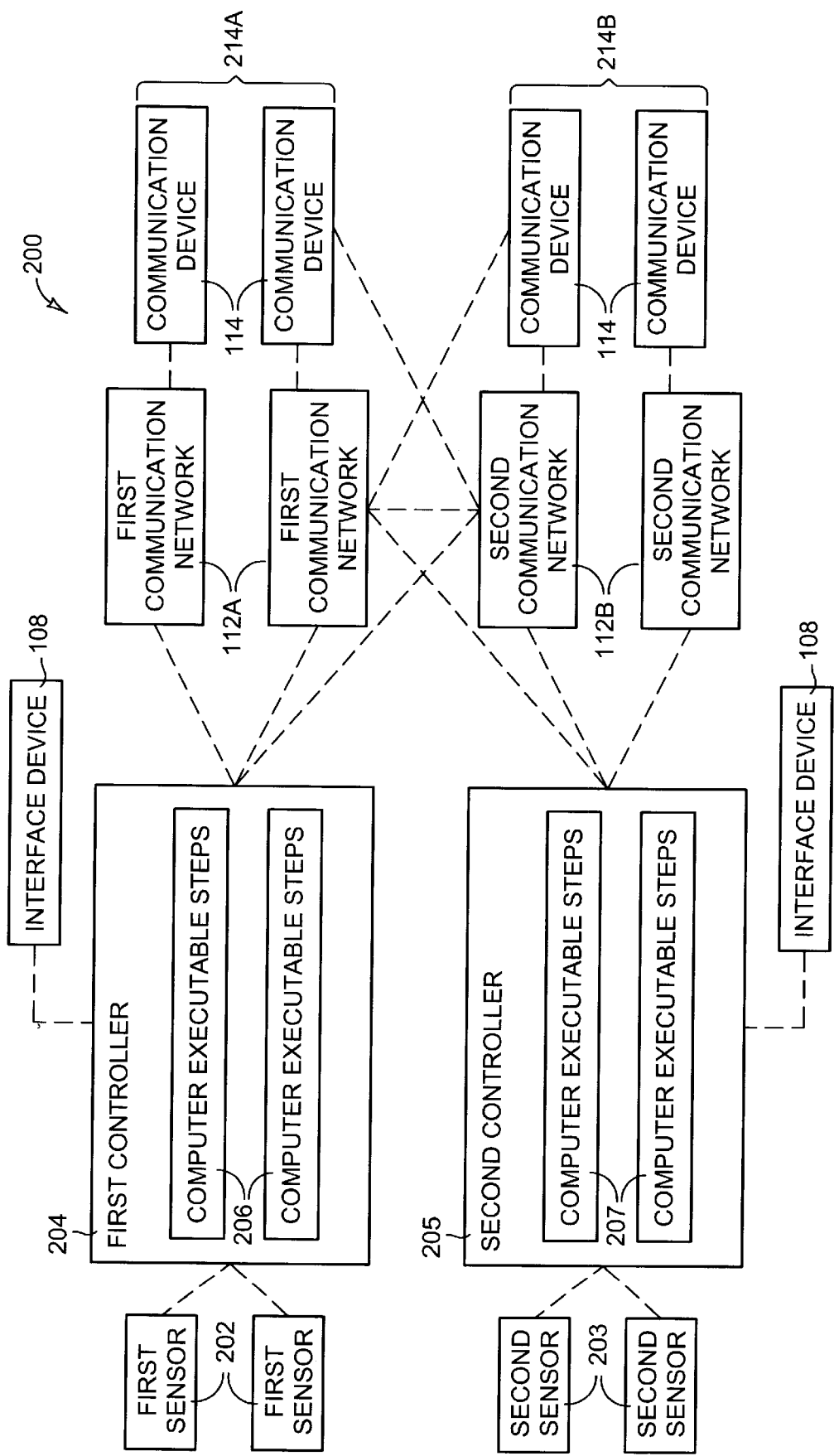
FIG. 2 is a schematic diagram of an apparatus in accordance with another embodiment of the present invention.

Now moving to FIG. 2, a schematic diagram is shown which depicts an apparatus 200 in accordance with another embodiment of the present invention. As can be seen by a study of both FIGS. 1 and 2, the apparatus 200 is essentially comprised of two of the apparatus 100 which are linked together by way of at least one respective communication network. That is, the apparatus 200 comprises at least one first sensor 202 which is configured in a manner similar to that of the sensor 102 which has been described above. The first sensor 202 is configured to detect a first event and is further configured to transmit a first signal in response to the first event.

As is also seen, the apparatus 200 comprises at least one second sensor 203 which is also configured in a manner similar to that of the sensor 102. The second sensor 203 is configured to detect a second event and is further configured to transmit a second signal in response to the second event. The apparatus 200 also comprises a first controller 204 and a second controller 205 which are each configured in manners similar to the controller 104 which is described above. As indicated by FIG. 2, the first sensor 202 is configured to be connected in signal communication with the first controller 204, while the second sensor 203 is configured to be connected in signal communication with the second controller 205. The apparatus 200 also comprises at least one communication device 114 which is described above.

The apparatus 200 can also comprise at least one first communication network 112A and one second communication network 112B which are each configured to carry a signal, such as the first and second signals, along with a corresponding alerting message between respective devices. The first and second communication networks 112A and 12B are also described above as communication network 112. In addition, the first controller 204 can contain a first sequence of computer executable steps 206. Likewise, the second controller 205 can contain a second sequence of computer executable steps 207. The first and second sets of computer executable steps 206, 207 are preferably configured to operate in manners substantially similar to the manner of the sequence of computer executable steps 106 which are explained above with regard to the apparatus 100. As is further seen in FIG. 2, a pair of interface devices 108 can be included in the apparatus 200, wherein each one of the pair of interface devices 108 can be connected in signal communication to respective first and second controllers 204, 205 as depicted. The interface devices 108 have been discussed above.

As is seen, the first and second controllers 204, 205 are configured to be connected in signal communication with one another by way of either, or both, of the respective first and second communication networks 112A and 112B. The first set of computer executable steps 206 of the apparatus 200 can be configured to route the alerting message from the first controller 204 to the second controller 205. The alerting message can be relayed from the first controller 204 to the second controller 205 byway of a respective communication network 112A, 112B. Additionally, the alerting message can be routed from the first controller 204 both directly to a respective communication device 114 and to the second controller 205. In any case, the first set of computer executable steps can be configured to selectively route the alerting message in accordance with the nature of the event and/or in accordance with any other factor as explained above with regard to the apparatus 100.

Thus, the first controller 204 is configured to receive a first signal from the first sensor 202, and is further configured to selectively route the first signal to the second controller 205 along with a first message which is indicative of the first event. The second controller 205 is configured to receive the first signal and the first message from the first controller 204, and is further configured to selectively route, or relay, the first signal and the first message to one of the communication devices 114. The second controller 205 is also configured to receive the second signal from the second sensor 203, and is further configured to selectively route the second signal to one of the communication devices 114 along with a second message which is indicative of the second event.

In other words, a first sensor 202 can detect the occurrence of an event and, in response thereto, send a signal to the first controller 204. The user of the first controller 204 can configure the first set of computer executable 206 steps within the first controller 204 to selectively route a resulting alerting message directly to any one of (or any combination of the communication devices 114 byway of either, or both, of the first and second communication networks 112A and 112B as explained above with regard to the apparatus 100. That is, and alerting message can be selectively sent from the first controller 204 to the second controller 205 and/or the any of the communication devices 114 by way of the first communication network 112A and/or the second communication network 112B.

When the alerting message is received by the second controller 205 from the first controller 204, the second set of computer executable steps can cause the alerting message to be relayed to a given communication device 114 by way of a respective communication network 112A, 112B. In order to illustrate one example of the use of the apparatus 200, a first communication device set 214A can comprise at least one communication device 114, while a second communication device set 214B can also comprise at least one communication device 114. Thus, the first communication device set 214A is configured to receive the first and second messages. Likewise, the second communication device set 214B is also configured to receive the first and second messages.

During the normal course of operations, the first communication device set 214A is under the direction and control of a first user as can be the first sensors 202 and the first controller 204. Likewise, the second communication device set 214B is normally under the direction and control of a second user as can be the second sensors 203 and the second controller 205. For example, the first sensors 202, the first controller 204, and the first communication device set 214A can be located in the residence of the first user. Similarly, the second sensors 203, the second controller 205, and the second communication device set 214B can be located in the residence of the second user.

Thus, during the normal course of operations of the apparatus 200, the first sensors 202 are configured to detect events which occur within the first user's residence and to transmit signals to the first controller 204 which is configured to selectively route, or relay, the signals, along with appropriate alerting messages, to the communication devices 114 of the first communication device set 214A which are generally carried or otherwise monitored by the first user. Similarly, the second sensors normally are normally configured to detect events which occur within the second user's residence and to transmit signals to the second controller 205 which is configured to selectively relay the signals, along with appropriate alerting messages, to the communication devices 114 of the second communication device set 214B which are generally carried or otherwise monitored by the second user.

Under certain circumstances, it can be agreed by both the first and second users that the second user will receive any alerting messages from the first user's residence. For example, if the first user travels out of town, or is admitted to a hospital, or is otherwise indisposed in a manner which necessitates monitoring of the first sensors by the second user. Thus, the first user can configure the first set of computer executable steps 206 to route alerting messages from the first controller 204 to the second controller 205. Likewise, the second user can configure the second set of computer executable steps 207 to accept alerting messages that are sent from the first controller 204. Additionally, the second set of computer executable steps 207 can be configured to relay the messages received from the first controller 204 to the second communication device set 214B so as to present the messages from the first controller to the second user.

The second controller 205, in addition to accepting alerting messages from the first controller 204, also can be caused to continue with its normal task of receiving signals from the second sensors 203 and relaying alerting messages to the second communication device set 214B. It is also understood that the first controller 204, in addition to relaying alerting messages to the second controller 205, can also continue to relay alerting messages to the first communication device set 214A. In this manner, both the first user and the second user are presented with alerting messages in response to detection of events within the first user's residence.

It is further understood that alerting messages can be selectively sent from the first controller 204 to the second controller 205 in accordance with predetermined criteria. That is, the first set of computer executable steps 206 can be configured so that some alerting messages are relayed only to the first communication device set 214A from the first controller 204, while other alerting messages are relayed only to the second controller 205 from the first controller, while still other messages are relayed to both the first communication device set and to the second controller. Still further, it is understood that the messages which are sent from the first controller 204 to the second controller 205 can be subject to routing criteria which is set by the second user. That is, once alerting messages are received by the second controller 205 from the first controller 204, those messages can then be routed in accordance with criteria dictated by the second user as manifested in the configuration of the second set of computer executable instructions 207.

For example, an alerting message that is sent to the first controller 204 from the first sensor 202 can be designated as a high priority message by the first set of computer executable instructions 206 and, as a result the high priority designation, be routed to the second controller 205 rather than, or in addition to, being routed to the first communication device group 214A. Once received by the second controller 205 from the first controller 204, the alerting message can be re-designated to a lower priority by the second set of computer executable instructions 207. Thus, the alerting message can then be routed from the second controller 205 in accordance with predetermined criteria established by the second user.

Figure 3:
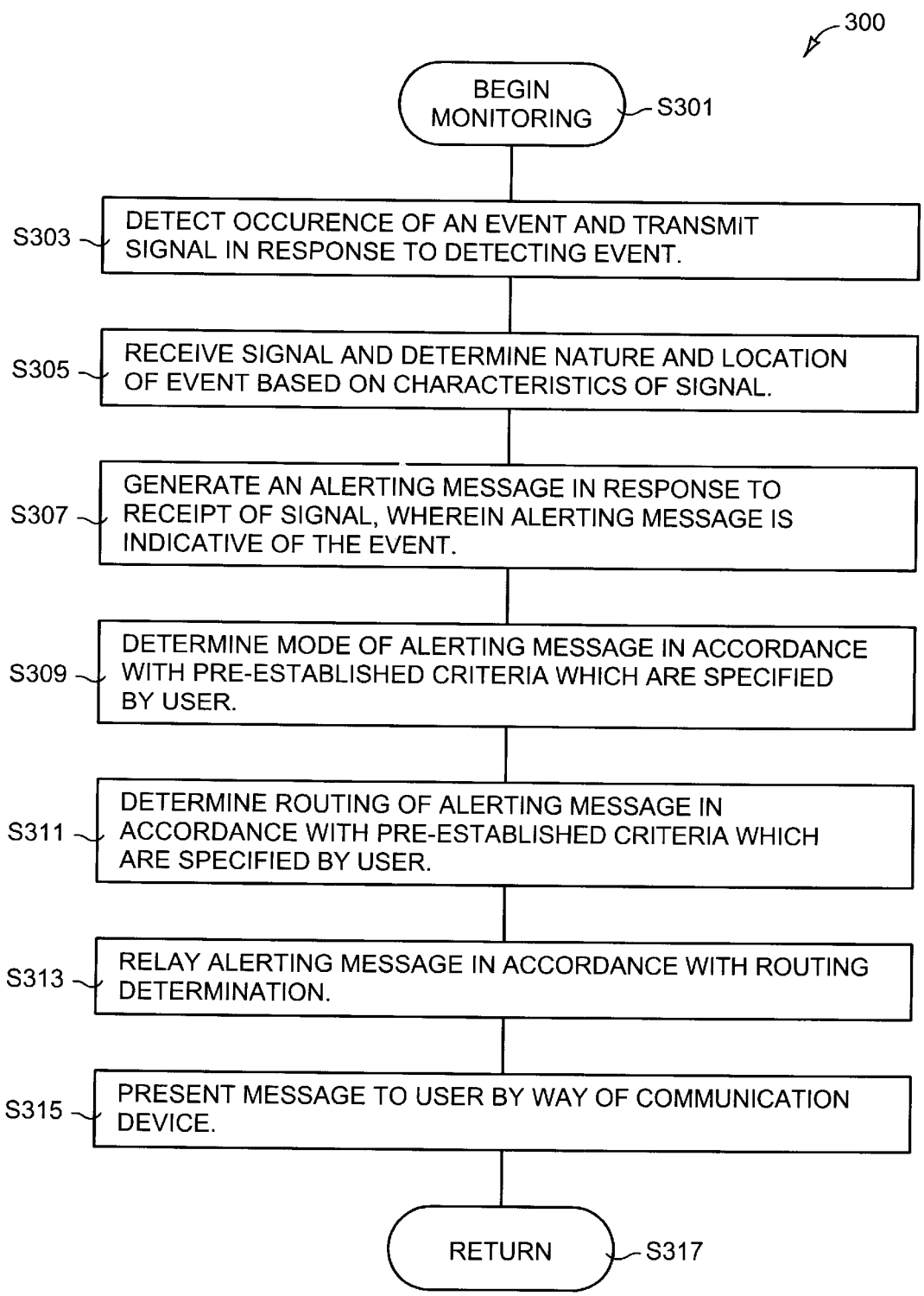
FIG. 3 is a flow diagram which depicts a sequence of steps which can describe the operation of the apparatus in accordance with the first embodiment of the present invention which is depicted in FIG. 1.

Turning now to FIG. 3, a flow diagram 300 is shown which depicts a sequence of steps which can occur during the operation of the apparatus 100 which is described above and shown in FIG. 1. As is seen in FIG. 3, the flow diagram 300 begins with step S301 wherein the monitoring sequence is initiated. From step S301 the diagram 300 progresses to step S303, wherein the occurrence of an event is detected and a signal is transmitted in response to the detection of the event. This step is preferably carried out in conjunction with a sensor such as the sensor 102 which is described above and shown in FIG. 1. The signal can be either a unique signal, or directed to a unique data receiving port, to thus allow the signal to be distinguishably identified as to the event. For example, once an event is detected by the sensor 102, a unique signal in the form of a serial number or code or the like can be transmitted thereby as described above. As also described above, the signal can be received by the controller 104 which is also shown in FIG. 1.

The next step of the flow diagram 300 is that of S305, as is seen in FIG. 3. In accordance with step S305, the signal is received, and the nature and location of the event is determined based on the characteristics of the unique signal. For example, as described above with regard to the apparatus 100, the controller 104 can be configured to compare a serial number, or other such code, which is transmitted by the sensor 102, to a list of known serial numbers, or codes, wherein the list contains corresponding locations and detecting capabilities for each serial number or code. In this manner, the nature and location of the event can be ascertained by the controller 102.

Moving on from step S305, the next step of the diagram 300 is step S307, wherein an alerting message is generated in response to the receipt of the signal. The alerting message is preferably indicative of the event. For example, preferably, the alerting message contains at least some description of the event, such as the type of event, the location of the event, the time of the event, and the like. The alerting message is preferably generated by the controller 104 which is shown in FIG. 1.

In accordance with the following step of S309, the mode of the alerting message is determined in accordance with pre-established criteria which is specified by the user. For example, the user can specify that, if a fire is detected, the resulting alerting message is to be sent in a visual text string and an audible alarm as well as a mechanical vibration. Alternatively, the user can specify that if a severe weather warning event is detected, for example, the alerting message is to be sent in a visual text string only.

Moving to step S311, the routing of the alerting message is determined in accordance with pre-established criteria which can also be specified by the user. For example, the user can specify that if a fire is detected, the resulting alerting message is to be routed to the user's cellular telephone, the user's pager, and the user's mobile personal computer. In accordance with step S313, the alerting message is then sent out, or relayed, to the appropriate communication devices as determined in step S311.

The next step is that of S315, wherein the alerting message is presented to the user by way of the communication devices which were specified by the user and determined in the previous step of S311. When the alerting message is presented to the user, the message is preferably deciphered by the user whereupon the user can initiate appropriate action in response to the occurrence of the event. In the alternative, step S315 can consist of sending an alerting message to a communication device which is configured as a receiver so as to initiate operation of a valve, an electrical switch, or the like as described above. In accordance with the step S317 of the flow diagram, the process then returns to step S301 to repeat the monitoring process.

In accordance with yet another embodiment of the present invention, a personal alerting method comprises the steps of detecting the occurrence of an event, generating a unique signal in response to the event, and generating an alerting message which is indicative of the event in response to the signal. For example if a fire occurs, the fire is detected, and a unique signal is transmitted in response to the fire. An alerting message is then generated in response to the unique signal, wherein the alerting message contains at least some information which indicates the nature of the event. For example, the alerting message can contain information which describes the event as a fire and also describes the location of the fire as well as the time the fire was detected.

The method also comprises the steps of relaying the alerting message in accordance with pre-established routing criteria, and presenting the alerting message in a mode which is decipherable by the user. That is, the alerting message can be relayed to any of several different communication devices in accordance with pre-established instructions of the user. For example, one of the criterion that can be used in determining the routing of the alerting message is the nature of the event itself. In other words, if the event is a fire the resulting alerting message is routed in a first manner. However, if the event is the ringing of a doorbell, the resulting alerting message is routed in a second manner which is different from the first. The alerting message is sent in any of several different available modes so as to be decipherable, or "readable" by the user, wherein the user can determine the nature of the event. That is, the alerting message can be sent in the modes of visual, audible, mechanical, electrical sensory-based, or the like.

While the above invention has been described in language more or less specific as to structural and methodical features, it is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A personal alerting apparatus, comprising:
  a sensor configured to detect an event, and further configured to transmit a signal in response to the event, wherein the event is selected from the group consisting of emergency event, operational event, and notification event;
  a communication device which is configured to receive the signal from the sensor and which is configured to, in response to receipt of the signal, alert the user as to the nature of the event, wherein the communication device is selected from the group consisting of telephone, cellular phone, pager, mobile computer, personal computer, personal digital assistant, internet-enabled device, and watch device;
  a controller which is configured to be connected in signal communication with the sensor and the communication device, and which is further configured to route the signal, along with a message indicative of the event, to the communication device in response to the receipt of the signal, to the communication device in response to the receipt of the signal, wherein the controller can be configured to determine a mode of the message, and wherein the mode is selected from the group consisting of visual, audible, mechanical, and electrical sensory-based.

2. A personal alerting apparatus, comprising:

a sensor configured to detect an event, and further configured to transmit a signal in response to the event, wherein the event is selected from the group consisting of emergency event, operational event, and notification event;

a communication device which is configured to receive the signal from the sensor and which is configured to, in response to receipt of the signal, alert the user as to the nature of the event, wherein the communication device is selected from the group consisting of telephone, cellular phone, pager, mobile computer, personal computer, personal digital assistant, internet-enabled device, and watch device;

a controller which is configured to be connected in signal communication with the sensor and the communication device, and which is further configured to route the signal, along with a message indicative of the event, to the communication device in response to the receipt of the signal;

a communication network which is configured to carry the signal and the message between the controller and the communication device, and wherein:

the controller can be configured to select the type of communication network to carry the signal and the message, and wherein the communication network is selected from the group consisting of pager network, telephone network, cellular telephone network, local area network ("LAN"), wide area network ("WAN"), ethernet system, satellite system, cable system (including analog, digital, and ISDN), digital subscriber lines ("DSL"), and the Internet; and, the controller can be configured to determine a mode of the message, and wherein the mode is selected from the group consisting of visual, audible, mechanical, and electrical sensory-based.

3. The apparatus of claim 2, and further comprising an interface device which is configured to be connected in signal communication with the controller, wherein the interface device is employable to configure the controller with regard to selecting the type of communication network and determining the mode of the message.

4. The apparatus of claim 3; and wherein the user is a physically impaired person.

* * * * *